United States Patent
Basumallik et al.

(10) Patent No.: US 9,135,027 B1
(45) Date of Patent: Sep. 15, 2015

(54) CODE GENERATION AND EXECUTION FOR DYNAMIC PROGRAMMING LANGUAGES

(71) Applicant: The MathWorks, Inc., Natick, MA (US)

(72) Inventors: Ayon Basumallik, Framingham, MA (US); Nikolay Mateev, Acton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/596,852

(22) Filed: Jan. 14, 2015

Related U.S. Application Data

(63) Continuation-in-part of application No. 13/658,996, filed on Oct. 24, 2012, now Pat. No. 8,943,474.

(60) Provisional application No. 61/551,787, filed on Oct. 26, 2011, provisional application No. 62/092,805, filed on Dec. 16, 2014.

(51) Int. Cl.
  *G06F 9/44* (2006.01)
  *G06F 9/445* (2006.01)

(52) U.S. Cl.
  CPC ...................................... *G06F 9/445* (2013.01)

(58) Field of Classification Search
  CPC ....................................................... G06F 9/445
  USPC ......................................................... 717/114
  See application file for complete search history.

(56) References Cited

U.S. PATENT DOCUMENTS

| | | | |
|---|---|---|---|
| 6,430,569 B1 * | 8/2002 | Bracha et al. ......................... | 1/1 |
| 6,976,029 B2 * | 12/2005 | Venkatesh et al. .................... | 1/1 |
| 7,424,410 B2 * | 9/2008 | Orofino et al. .................... | 703/2 |
| 7,574,700 B2 | 8/2009 | Bracha | |
| 7,657,874 B2 * | 2/2010 | Lidin et al. ..................... | 717/126 |
| 7,725,883 B1 | 5/2010 | Nylander et al. | |
| 7,802,268 B2 | 9/2010 | Webb et al. | |
| 7,809,545 B2 | 10/2010 | Ciolfi et al. | |
| 8,046,751 B1 | 10/2011 | Avadhanula et al. | |
| 8,060,857 B2 * | 11/2011 | Biggerstaff ................... | 717/106 |

(Continued)

OTHER PUBLICATIONS

Igor Bohm, "Automatic Code Generation Using Dynamic Programming Techniques", Johannes Kepler University of Linz, Austria, http://www.bytelabs.org/pub/papers/hburg07.pdf, Oct. 2007, pp. 1-97.

(Continued)

*Primary Examiner* — Don Wong
*Assistant Examiner* — Theodore Hebert
(74) *Attorney, Agent, or Firm* — Harrity & Harrity, LLP

(57) ABSTRACT

A device may identify a first compiled block with an original constraint and an additional constraint. The first compiled block may be identified based on a program counter value and may include compiled information relating to a first segment of program code, linking information associated with a second compiled block, and information distinguishing the original constraint from the additional constraint. The original constraint may relate to a type of variable used in the first segment of programming code. The additional constraint may relate to a variable used in a second segment of programming code associated with the second compiled block. The device may copy information of the first compiled block to generate a third compiled block that lacks the additional constraint. The device may execute the third compiled block to execute a program associated with the programming code.

20 Claims, 9 Drawing Sheets

(56) References Cited

U.S. PATENT DOCUMENTS

| | | | |
|---|---|---|---|
| 8,171,453 B2* | 5/2012 | Meijer et al. | 717/114 |
| 8,321,833 B2* | 11/2012 | Langworthy et al. | 717/106 |
| 8,365,088 B1 | 1/2013 | Rodriguez et al. | |
| 8,473,901 B1 | 6/2013 | Johnson | |
| 8,538,899 B1 | 9/2013 | Orqueda et al. | |
| 8,539,463 B2 | 9/2013 | De et al. | |
| 8,627,281 B2 | 1/2014 | Tatsubori | |
| 8,627,282 B1* | 1/2014 | Karr | 717/114 |
| 8,769,486 B2 | 7/2014 | Webb | |
| 8,813,027 B2 | 8/2014 | Ng et al. | |
| 8,826,229 B2 | 9/2014 | Foti | |
| 8,943,474 B1* | 1/2015 | Basumallik et al. | 717/114 |
| 2002/0129177 A1* | 9/2002 | McGuire et al. | 709/315 |
| 2003/0097648 A1 | 5/2003 | Allison | |
| 2003/0154468 A1 | 8/2003 | Gordon et al. | |
| 2005/0091420 A1* | 4/2005 | Snover et al. | 710/1 |
| 2006/0048095 A1 | 3/2006 | Meijer et al. | |
| 2006/0212882 A1 | 9/2006 | Foti et al. | |
| 2006/0277526 A1 | 12/2006 | Webb et al. | |
| 2007/0055978 A1 | 3/2007 | Meijer et al. | |
| 2007/0234288 A1 | 10/2007 | Lindsey et al. | |
| 2007/0288885 A1 | 12/2007 | Brunel et al. | |
| 2008/0052730 A1 | 2/2008 | Webb et al. | |
| 2008/0104592 A1* | 5/2008 | Heifets et al. | 718/1 |
| 2008/0127147 A1* | 5/2008 | Bottomley et al. | 717/151 |
| 2008/0209394 A1 | 8/2008 | Andersen et al. | |
| 2008/0216061 A1 | 9/2008 | Allen | |
| 2009/0037158 A1 | 2/2009 | Shakeri et al. | |
| 2011/0131556 A1 | 6/2011 | Tatsubori | |
| 2011/0179402 A1 | 7/2011 | Buckley et al. | |
| 2011/0239188 A1 | 9/2011 | Lindsey et al. | |
| 2012/0180025 A1* | 7/2012 | Webb | 717/114 |
| 2012/0216077 A1 | 8/2012 | Christensen et al. | |
| 2013/0031536 A1 | 1/2013 | De et al. | |
| 2013/0290987 A1 | 10/2013 | Meijer et al. | |
| 2014/0040860 A1 | 2/2014 | Darcy et al. | |

OTHER PUBLICATIONS

Zaeem et al., "Test Input Generation Using Dynamic Programming", 2012 ACM, SIGSOFT'12/FSE-20, Cary, North Carolina, USA, http://dl.acm.org/results.cfm?h=1 &cfid=417717926 &cftoken=68174932, Nov. 2012, pp. 1-11.

Park et al., "Dynamic Code Overlay of SDF-Modeled Programs on Low-end Embedded Systems", IEEE, http://ieeexplore.ieee.org/stamp/stamp.jsp?tp=&arnumber=1657026, Mar. 2006, pp. 1-2.

* cited by examiner

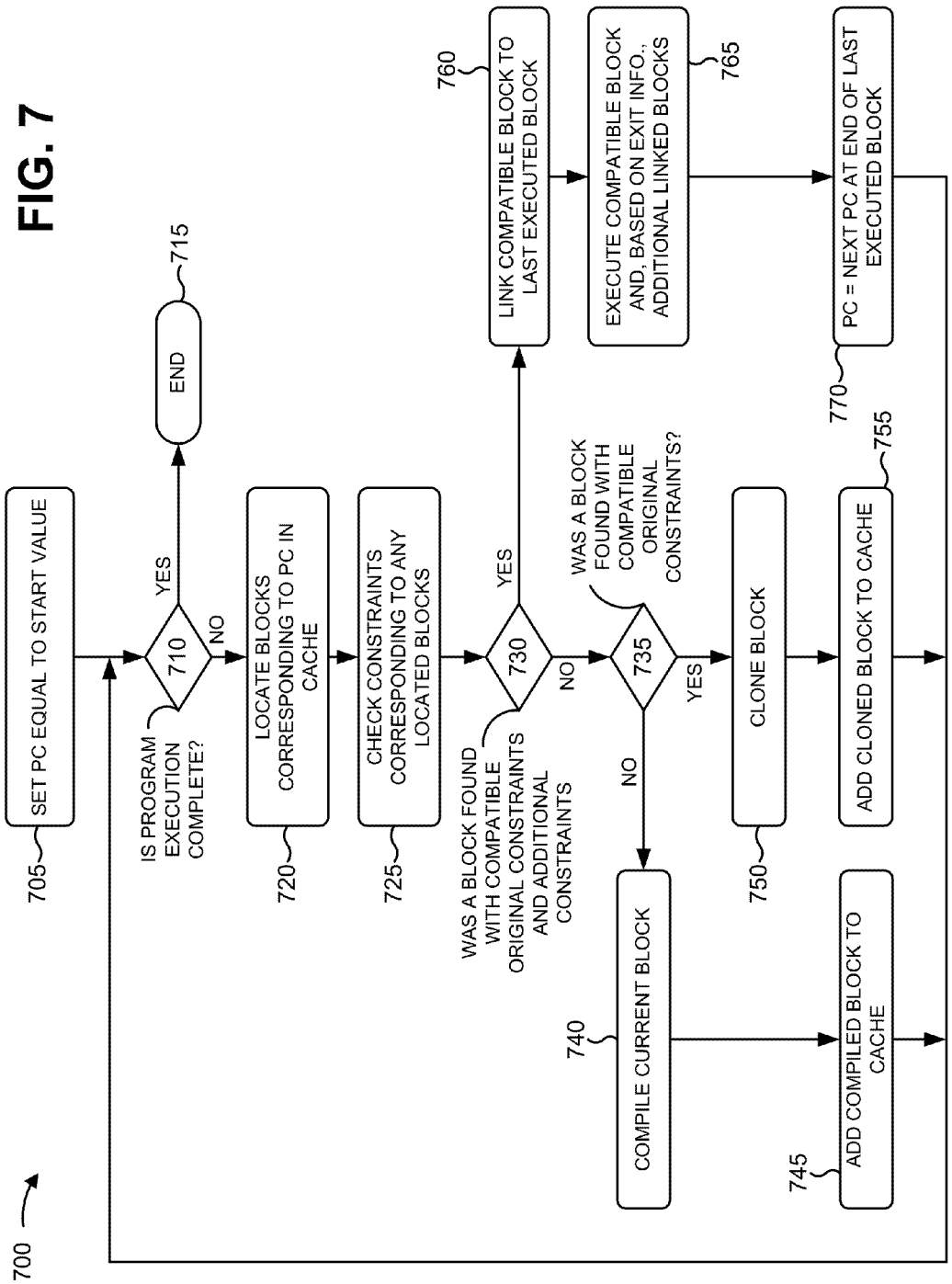

CODE GENERATION AND EXECUTION FOR DYNAMIC PROGRAMMING LANGUAGES

RELATED APPLICATION(S)

This application is a continuation-in-part of U.S. patent application Ser. No. 13/658,996, filed on Oct. 24, 2012, which claims priority to U.S. Provisional Patent Application No. 61/551,787 filed on Oct. 26, 2011. Those applications are incorporated by reference herein in their entireties.

This application claims priority under 35 U.S.C. §119 to U.S. Provisional Patent Application No. 62/092,805, filed on Dec. 16, 2014, the content of which is incorporated by reference herein in its entirety.

BRIEF DESCRIPTION OF THE DRAWINGS

FIG. 7 is a flow chart of an example process for performing code generation and execution for a dynamic programming language.

DETAILED DESCRIPTION

The following detailed description of example implementations refers to the accompanying drawings. The same reference numbers in different drawings may identify the same or similar elements.

A dynamic programming language may broadly refer to a class of programming languages that may perform one or more operations at runtime that would normally be performed, in a static programming language, at compile time. These operations may include type-checking of variables, extending the behavior of program objects, and/or other operations.

Relative to static programming languages, dynamic programming languages can provide a more flexible computing environment that may tend to decrease developer programming time. A program implemented in dynamic programming languages, however, frequently executes slower than a program implemented in a static programming language. Program code associated with a dynamic programming language may be generated as a block. A block may correspond to a program code segment that has an entry and a set of exits. Types of values within a block may be deterministic or inferable with analysis. A block may be created for a set of types, and multiple versions may be generated for the block. A version may differ only in the type of values that the version handles. Multiple blocks may be selected and linked for execution.

A block of program code may be compiled and associated with a set of constraints. During execution, a compiled block, with constraints that match a desired set of constraints, may be selected for execution. A first compiled block, with a set of original constraints, may be linked to a second compiled block with a set of additional constraints that may be back-propagated to the first compiled block, thereby improving computing performance. When determining a block for execution, the original constraints may satisfy a set of desired constraints, but the additional constraints may not satisfy the set of desired constraints, thereby preventing the first compiled block from being selected for execution. A first block of programming code may be re-compiled as a third compiled block with the original constraints and without a link to the second block and without the additional constraints associated therewith. However, compiling the programming code to generate the third compiled block may involve allocation of processing resources, storage resources, or the like. Implementations, described herein, may clone a compiled block with a set of original constraints and without a set of additional constraints associated with a linked compiled block, thereby reducing computing resources associated with re-compiling programming code.

Figure 1:
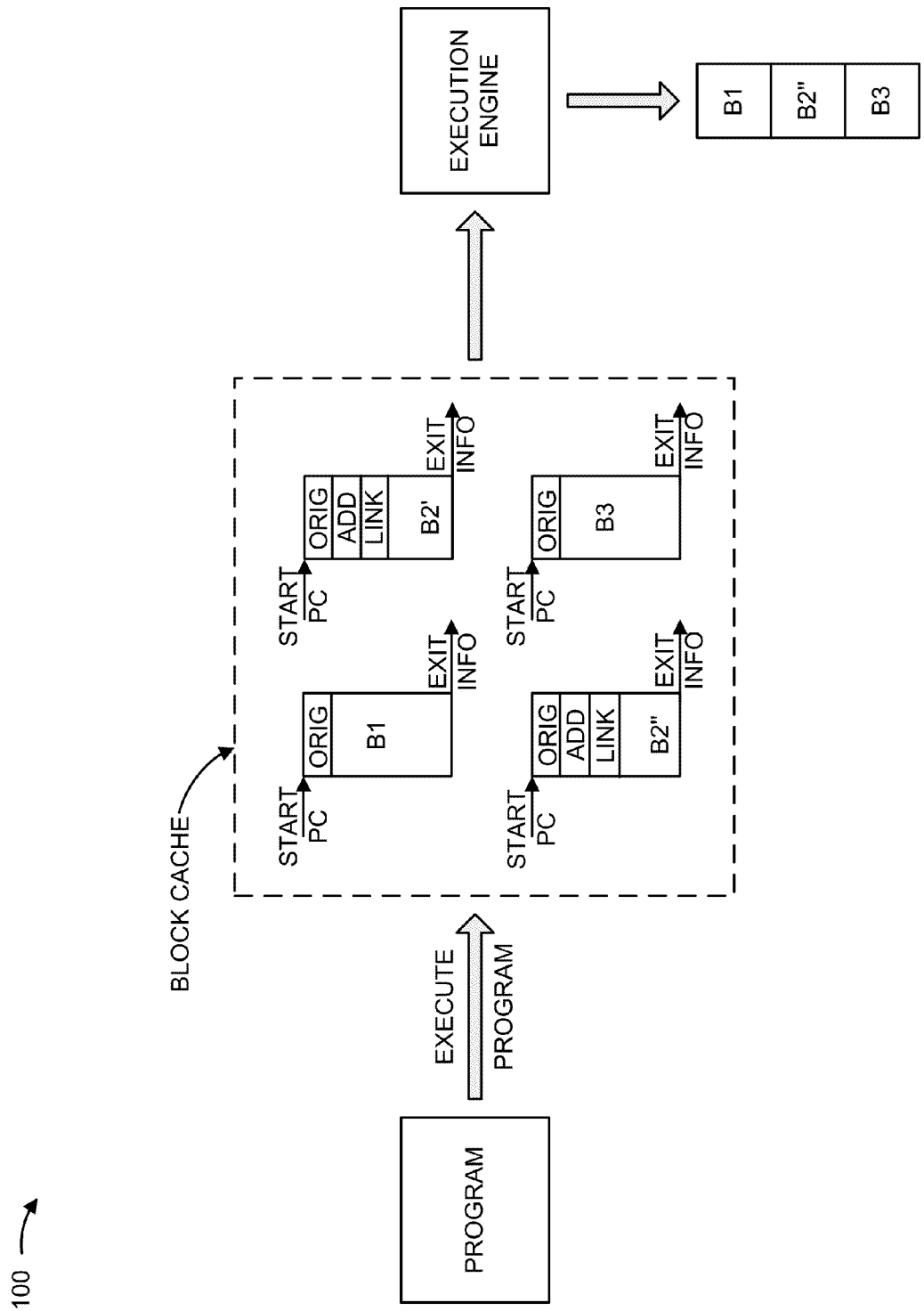
FIG. 1 is a diagram of an overview of an example implementation described herein.

FIG. 1 is a diagram of an overview of an example implementation 100 described herein. As shown in FIG. 1, a computing environment, such as a technical computing environment (TCE), may include a program, a block cache, and an execution engine. The program may include programming code created using a dynamic programming language, such as the MATLAB® programming language, Python, Ruby, JavaScript, etc. The block cache may include a data structure, stored in a memory, that stores blocks (or compiled segments) of the program. The execution engine may execute the program by executing the blocks stored in the block cache.

A programmer may create the program using a dynamic programming language, and, at some point, may wish to execute the program. The programmer may initiate execution of the program through a computing environment, such as the TCE or another computing environment. The program may be executed by segmenting the program into blocks, and each block may represent a segment of the program that has an entry and a set of exits. Blocks may be selected so that, within a block, the types of variables within the block are deterministically known or can be inferred. Each of the blocks of the program may be compiled. In some implementations, not all of the blocks of the program may be immediately compiled. For example, blocks may be compiled as needed for execution of the program. In some implementations, the compiled blocks may be cached so that blocks may be reused without having to be re-compiled.

As further shown in FIG. 1, the blocks may be stored in the block cache. For example, the block cache may store four blocks labeled as blocks B1, B2', B2", and B3. Each block may be associated with original constraints (ORIG), beginning program counter (START PC) values, and information about block exits (EXIT INFO). Some blocks, such as block B2' and block B2", may be linked to another block (not shown) and may include additional constraints (ADD) back-propagated from the other block. The constraints for a block may represent conditions that should be satisfied before a block can be selected for execution. The original constraints may represent conditions that should be satisfied before a block, which includes the original constraints, is executed. The additional constraints may represent conditions that should be satisfied before a block, which is linked to a block that includes the additional constraints, is executed. The conditions may be based on variables (e.g. temporary program values) and corresponding variable types that may be read within a particular block. The beginning PC values may represent a location, within the program, at which the block begins. The exit information may describe variables and corresponding variable types that are written within a particular block. The exit information may also include a program counter for the next block to be executed.

Multiple blocks may represent the same segment of code in the program. For example, a particular segment of code in the program may read a variable "X." Because the program is expressed in a dynamic programming language, the type of variable "X" may not be determinable before execution of the program. For instance, at one point during the execution of the particular segment of the program, variable "X" may be an integer. At another point during the execution of the particular segment of the program, variable "X" may be a real number (e.g., double type). Accordingly, the block cache may include multiple compilations of the particular segment of the code, where the different compilations may make different assumptions about the type of variable "X." The correct compiled block to use may be determined during execution of the program. In FIG. 1, blocks B2' and B2" are shown, which may represent different compilations of the same segment of the program.

During a run-time operation, the execution engine may execute the compiled blocks provided in the block cache. At the end of a block, the next PC value in the exit information may be used to obtain a set of blocks that are next candidates to be executed. The constraints for each block, in the set of blocks, may be used to determine which block to execute. If no blocks are determined to be executable from the set, a new block may be compiled. In the example of FIG. 1, the execution engine is shown as having selected blocks B1, B2", and B3 as the series of blocks to execute.

In some implementations, to optimize the operation of the execution engine, blocks may be linked to create a series of linked blocks. A link between two blocks may indicate that a block, associated with an inbound link, may always follow another block associated with a corresponding outbound link. The additional constraints associated with the second block to be executed that is being linked to a first block to be executed may be back-propagated from the second block to the first block. In this case, execution of the program may be made more efficient as the execution engine may not need to check the block constraints before executing the block associated with the inbound link, the execution engine may check the original constraints and additional constraints that have been back-propagated to the first block when selecting a block.

In some implementations, the original constraints may match a set of desired constraints being checked by the execution engine, but the additional constraints may not match the desired set of constraints. In this case, the compiled block may be cloned with the original constraints and without the link to an additional block associated with the additional constraints, thereby reducing processing and/or memory utilized to execute a program and improving code execution.

The terms "code," "program," and/or "programming code" as used herein, are to be used interchangeably and are to be broadly interpreted ton include text-based code that may require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations.

Figure 2:
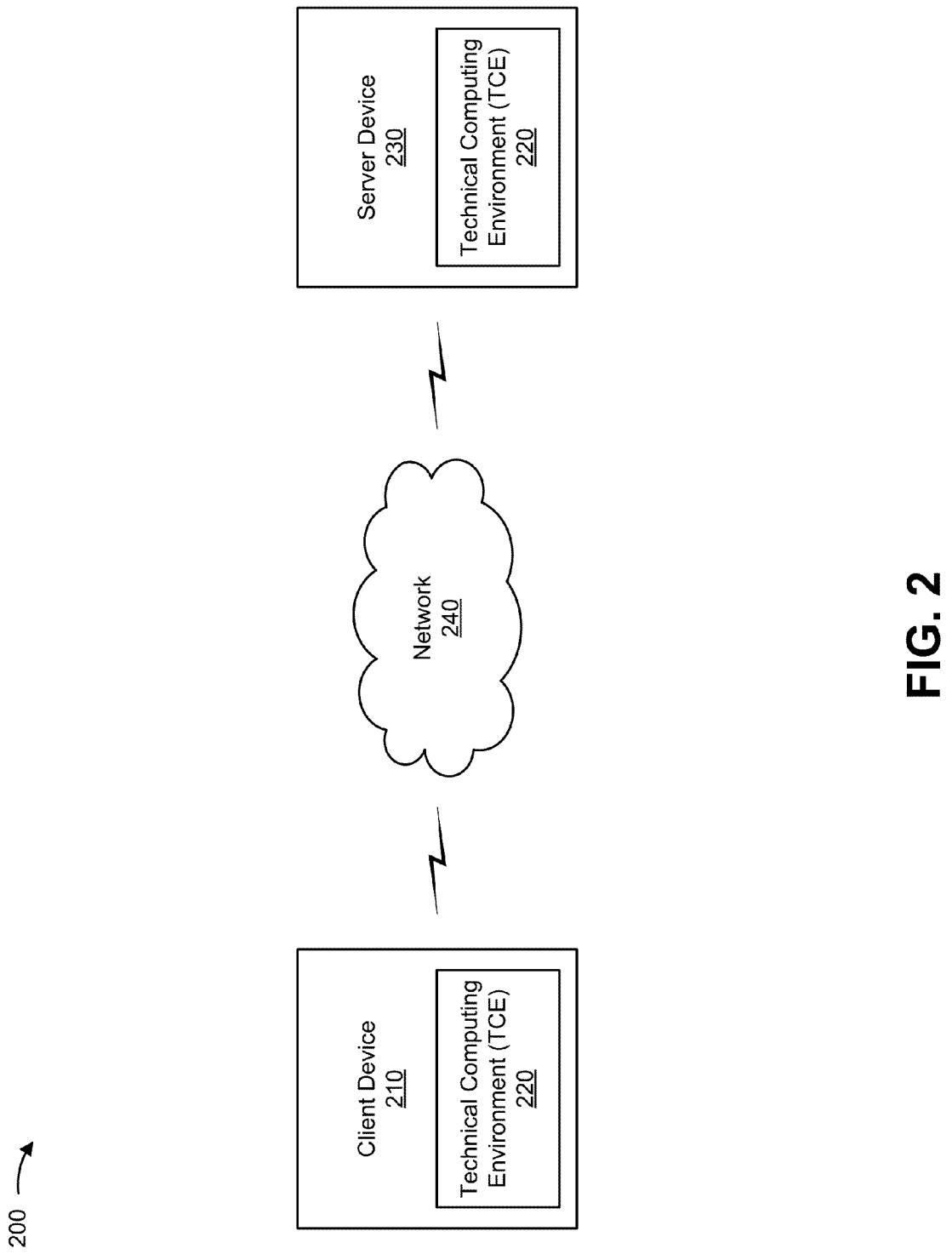
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, processing, and/or providing information associated with compiling and/or executing program code. For example, client device 210 may include a computing device, such as a desktop computer, a laptop computer, a tablet computer, a mobile phone (e.g., a smart phone, a radiotelephone, etc.), or a similar device. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include a programming language that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:
A='hello'
A=int32([1, 2])
A=[1.1, 2.2, 3.3]

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

Server device 230 may include one or more devices capable of receiving, generating, storing, processing, and/or providing information associated with compiling and/or executing program code. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution). Additionally, or alternatively, server device 230 may perform one, more, or all operations described elsewhere herein as being performed by client device 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
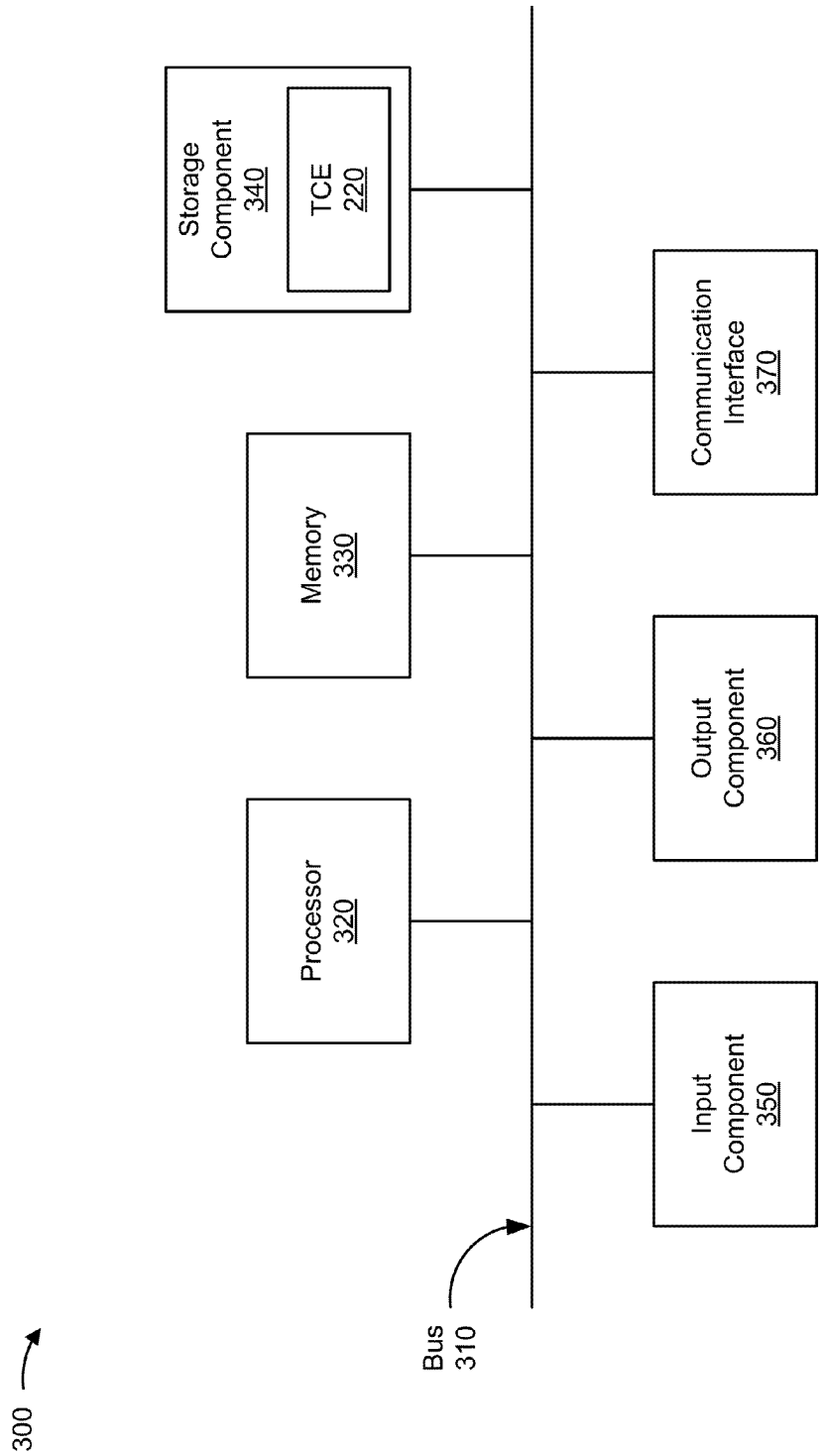
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
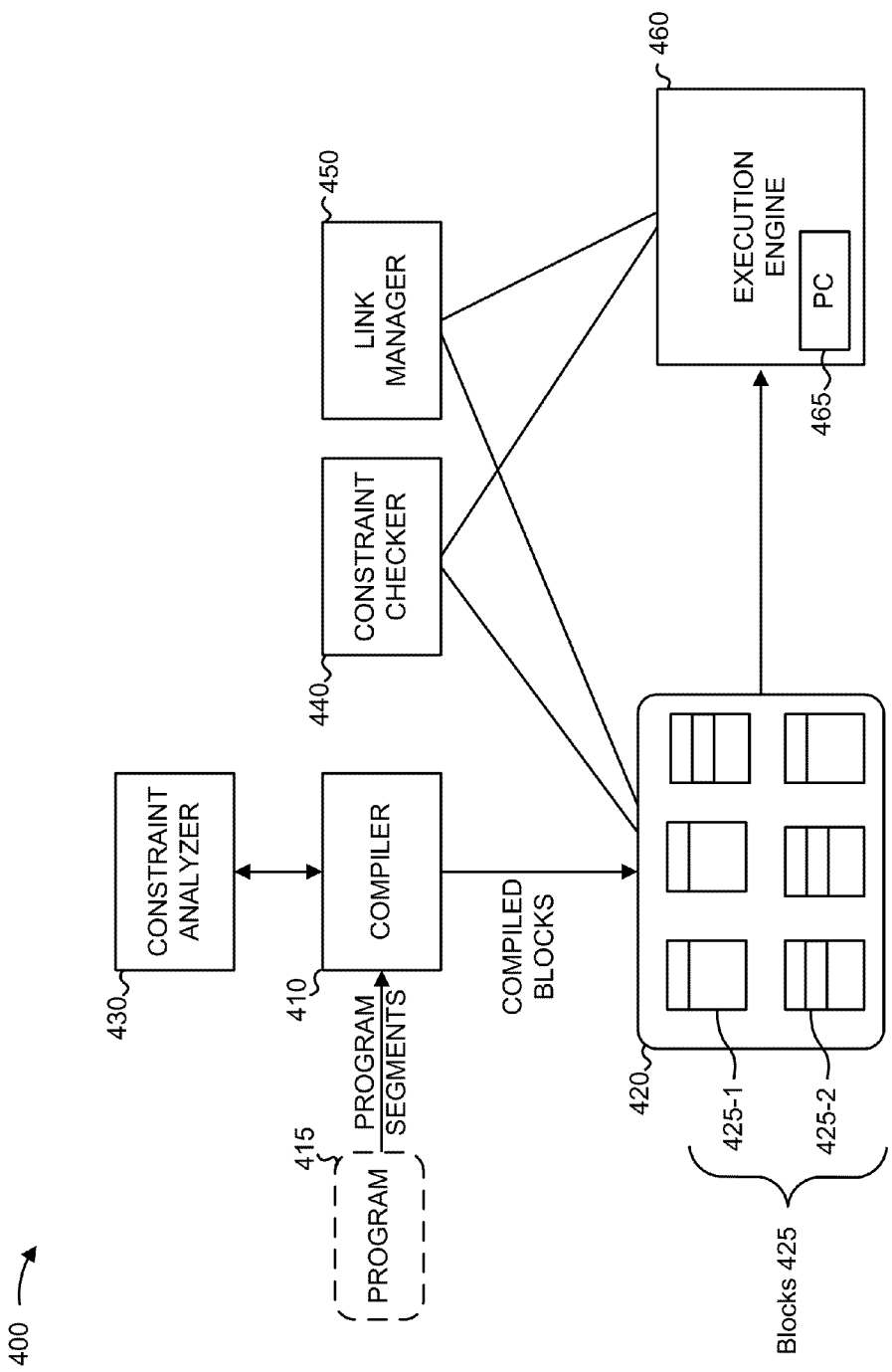
FIG. 4 is a diagram of example functional components of a technical computing environment.

FIG. 4 is a diagram of example implementation 400 of functional components of a technical computing environment (e.g., TCE 220). As shown in FIG. 4, TCE 220 may include a compiler 410, a cache 420, a constraint analyzer 430, a constraint checker 440, a link manager 450, and an execution engine 460.

Compiler 410 may transform an input program 415, written in a dynamic programming language (e.g., a source language), into a second programming language, which may be referred to as a target language. Compiler 410 may compile program 415 in a piecemeal fashion in which segments of program 415 (e.g., program segments) are compiled on-the-fly and as needed for program execution. The target language may include a binary form that is designed to execute on a particular processor or hardware platform. In some implementations, compiler 410 may first convert program 415 into an intermediate representation (IR) that may then be converted into the target language. Although the operations of FIG. 4 are described as being applied to program 415 written in a dynamic programming language, the operations of FIG. 4 may also be applied to intermediate representation of program 415. In this case, program 415 may be converted into the intermediate representation by compiler 410 or by another component, such as a pre-compiler (not shown). The pre-compiler may then input the intermediate representation, as program segments, to compiler 410.

Each program segment, after compiling by compiler 410, may be referred to as a block or a compiled block herein. A block may include one entry and one or more exits. Blocks may be selected so that types of variables and/or temporary program values within the block are deterministically known or can be inferred. For example, an abstract interpretation technique may be used to determine the types of variables and/or temporary program values within the blocks. In some implementations, occurrences of loops or other programmatic control flows may terminate a block. For example, each block may represent a linear sequence of program instructions for which abstract interpretation can be performed. Statements that cannot be abstractly interpreted may terminate a block. Compiler 410 may provide the compiled blocks to cache 420.

Cache 420 may receive and store a set of blocks 425 (e.g., the compiled blocks), in some implementations. Cache 420 may include, for example, a quantity of memory, such as volatile or non-volatile computer memory, which may include a data structure. Block 425-1 may indicate, for example, a compiled block that has not been linked to another block 425. Block 425-2 may indicate, for example, a compiled block that is linked to another block 425 and includes additional constraints associated with the other block 425. Blocks 425, stored in cache 420, may be associated with a program counter value at which a block 425 occurs, and may also be associated with constraints that define conditions that should be satisfied before a block 425 can be executed. Constraints may include original constraints that are associated with a first block 425 and/or additional constraints that are associated with a second block 425 that is linked to the first block 425. In some implementations, blocks 425 may include information distinguishing original constraints from additional constraints. Linking information that defines links between blocks 425 may also be associated with blocks 425. In some implementations, the constraints and the linking information may be stored as part of each block 425, and the program counter may be used as an index by which blocks 425 are stored in cache 420. Thus, for any particular program counter value, a corresponding set of blocks 425, in cache 420, may be obtained.

As compiler 410 compiles blocks 425, a quantity of blocks 425 in cache 420 may increase, in some implementations. In some implementations, if execution of program 415 results in a previously executed block 425 being executed a second (or additional) time, the previously executed block 425 may be obtained from cache 420 without having to be re-compiled by compiler 410. In some implementations, a first block 425 in cache 420 that is linked to a second block 425 may be cloned to create a third block 425 that includes original constraints associated with first block 425 but not additional constraints back-propagated to first block 425 from second block 425. In some implementations, blocks 425 in cache 420 that are no longer valid, such as blocks 425 for which the associated type-based constraints are rendered incomplete or are otherwise no longer valid, based on a current state of the computing environment, may be removed from cache 420. For example, when a user (e.g., a programmer) indicates that a new or different program 415 is to be executed, cache 420 may be cleared. Additionally, or alternatively, cache 420 may continue to store blocks 425, corresponding to program 415, for efficient future execution of program 415.

Constraint analyzer 430 may determine run-time information (e.g., read and write lists) for blocks 425 in cache 420. For example, constraint analyzer 430 may determine the read and write lists for a block 425, based on interaction with compiler 410 and while compiler 410 is compiling block 425. As used herein, a read list, for a block 425, may refer to variables that are read by block 425, and corresponding types of the variables that are read. Similarly, as used herein, a write list, for a block 425, may refer to variables that are written by block 425, and corresponding types of the variables that are written.

In some implementations, constraint analyzer 430 may determine the read and write lists for a block 425 based on abstract interpretation of types. Abstract interpretation may refer to an approximation of semantics of program code without executing, or without fully executing, the program code. Constraint analyzer 430 may perform abstract interpretation based on a predefined association of functions, input types to the functions, and a corresponding result output type. For example, consider the program code:

z=y+3.

If "y" and "3" are known to be of "double" types, constraint analyzer 430 may identify a predefined signature corresponding to addition, such as:

+: <double, double>→double, which may indicate that, for addition, when both operands are of type "double," the result is also of type "double." As another example, a predefined signature for multiplication may be:

*: <double, double>→double, which may indicate that, for multiplication, when both operands are of type "double," the result is also of type "double." The abstract interpretation, performed by constraint analyzer 430, may be relatively fast compared to abstract interpretation applied to a complete program. In particular, because blocks 425 analyzed by constraint analyzer 430 may be limited to linear blocks that do not contain control flows, the abstract interpretation may be a fast abstract interpretation.

In some implementations, program 415 may include pointer variables. The pointer variables may be aliased so that multiple different pointer variables can point to a single location. For example, if two pointer variables, "x" and "y," are aliased to one another, changing a type of one of the variables may correspondingly change a type of the other variable. For example, consider the pointer variables:

*x←3.0;
*y←int32(3.0).

If the "x" and "y" pointer variables are aliased, the second assignment to "y" may change the type of "x" to "int32." When handling pointer types, constraint analyzer 430 may account for pointer aliasing by including a unique identifier as part of the pointer's type. In some implementations, the location pointed to, by the pointer, may be used as the unique identifier. For example, for the statement "*x←3.0," the type interpretation for "x" may be "pointer_to_double_at_location_L1." Similarly, for the statement "*y←int(32)," the type interpretation for "y" may be "pointer_to_int32_at_location_L2." Additionally, or alternatively, a location in the program code may be used to derive the unique identifier. In this manner, pointer aliasing may be accounted for in the type representation for pointer variables. This manner of resolution of pointer aliases may be more efficient than typical schemes used for resolution of pointer aliases.

The read list for a block 425 may correspond to constraints for block 425. In some implementations, the read list and the constraints, for block 425, may be based only on variables that are within a lexical scope at the start of block 425. Lexical scope may refer to a context, within program code, in which a variable name is valid and can be used. Block boundaries may be selected so that lexical scope changes are only allowed at block boundaries.

Constraint checker 440 may verify run-time types of variables. Constraint checker 440 may, for example, communicate with execution engine 460 and/or be implemented as part of execution engine 460, to determine actual types in an execution environment of variables in program code being executed by execution engine 460. Constraint checker 440 may additionally determine whether the actual types of variables in the executing program code match constraints associated with blocks 425. Block 425 may be executed by execution engine 460 when variables in a read list of block 425 include the same types in a current program state as the variables had in a program state when block 425 was compiled by compiler 410.

Link manager 450 may manage links between blocks 425. In some implementations, link manager 450 may analyze blocks 425 to determine links between blocks 425. The links may be used to define relationships between blocks 425, such as whether a particular block 425 is guaranteed or likely to follow another block 425. The links between blocks 425 may be used to reduce an amount of constraint checking that may otherwise be required to determine a next block 425 to execute. The use of links may optimize the selection of blocks 425 and may therefore improve execution efficiency of program 415.

Execution engine 460 may execute program 415 by executing blocks 425. Execution engine 460 may, for example, read blocks 425, from cache 420, in an order corresponding to a program flow of program 415. Execution engine 460 may maintain a program counter (PC) 465, which may include a value that defines a current execution point in program 415. As will be described in more detail below, program counter 465 may be used in determining which block 425 is next in the execution of program 415.

As indicated above, FIG. 4 is provided merely as an example. Other examples are possible and may differ from what was described with regard to FIG. 4.

Figure 5:
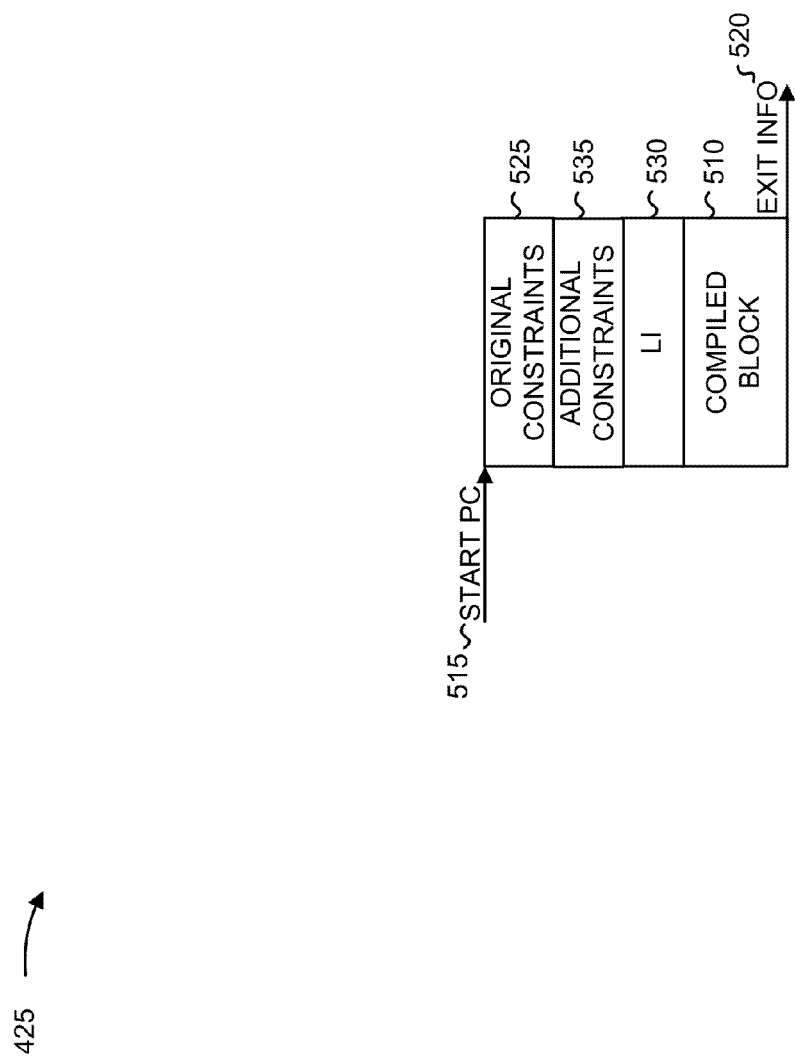
FIG. 5 is a diagram of an example implementation of a compiled example block.

FIG. 5 is a diagram of an example implementation 500 of a compiled example block.

As shown in FIG. 5, block 425 may include compiled block code 510 and additional data relating to block 425, such as a start program counter (PC) value 515, exit information (EXIT INFO) 520, original constraints 525, linking information (LI) 530, and additional constraints 535. Since block 425 may include multiple exits, exit information 520 may describe the multiple exits. The additional data may be stored with block 425, in cache 520, or elsewhere (e.g., linking information 530 may be generated and stored by link manager 550).

Compiled block code 510 may include a compiled version of the program segment corresponding to block 425, after compiling by compiler 510. Start PC value 515 may indicate a starting location of block 425 within program 515. Original constraints 525 may include constraints for block 425, such as, for example, type constraints relating to variables or temporary program values that are read by block 425. Original constraints 525 may correspond to a read list for block 425, as may be determined by constraint analyzer 530. Additional constraints 535 may include constraints for block 425 that have been back propagated from another block 425 and may correspond to a read list for the other block 425. In other words, block 425 may include original constraints 525 based on program code compiled for block 425 and additional constraints 535 based on program code compiled for another block 425 that is linked to block 425 (e.g., identified by linking information 530).

Exit information 520 may include information about one or more exits of block 425. The information for an exit may include the starting PC for the next program segment if the next segment is known. The information for an exit may also include a description of the types of variables or temporary program values that are guaranteed to be written by block 425.

Linking information 530 may include links, if any, corresponding to block 425. The links for block 425 may be generated and/or determined by link manager 550. In some implementations, the links for block 425 may be stored as one or more outbound links from block 425 to other blocks. In this case, the other blocks may be blocks that are known to follow or that are good candidates to follow block 425. A link may indicate that a linked-to block's constraints are guaranteed to be satisfied following block 425. In some implementations, the links may include direct links or indirect links. A direct link may be created when the starting PC of the next block is known and available in exit information 520, and an indirect link may be used when the starting PC of the next block is not available in exit information 520.

Although FIG. 5 shows example information that may be included in block 425, in other implementations, block 425 may include less information, different information, differently arranged information, and/or additional information than depicted in FIG. 5.

Figure 6:
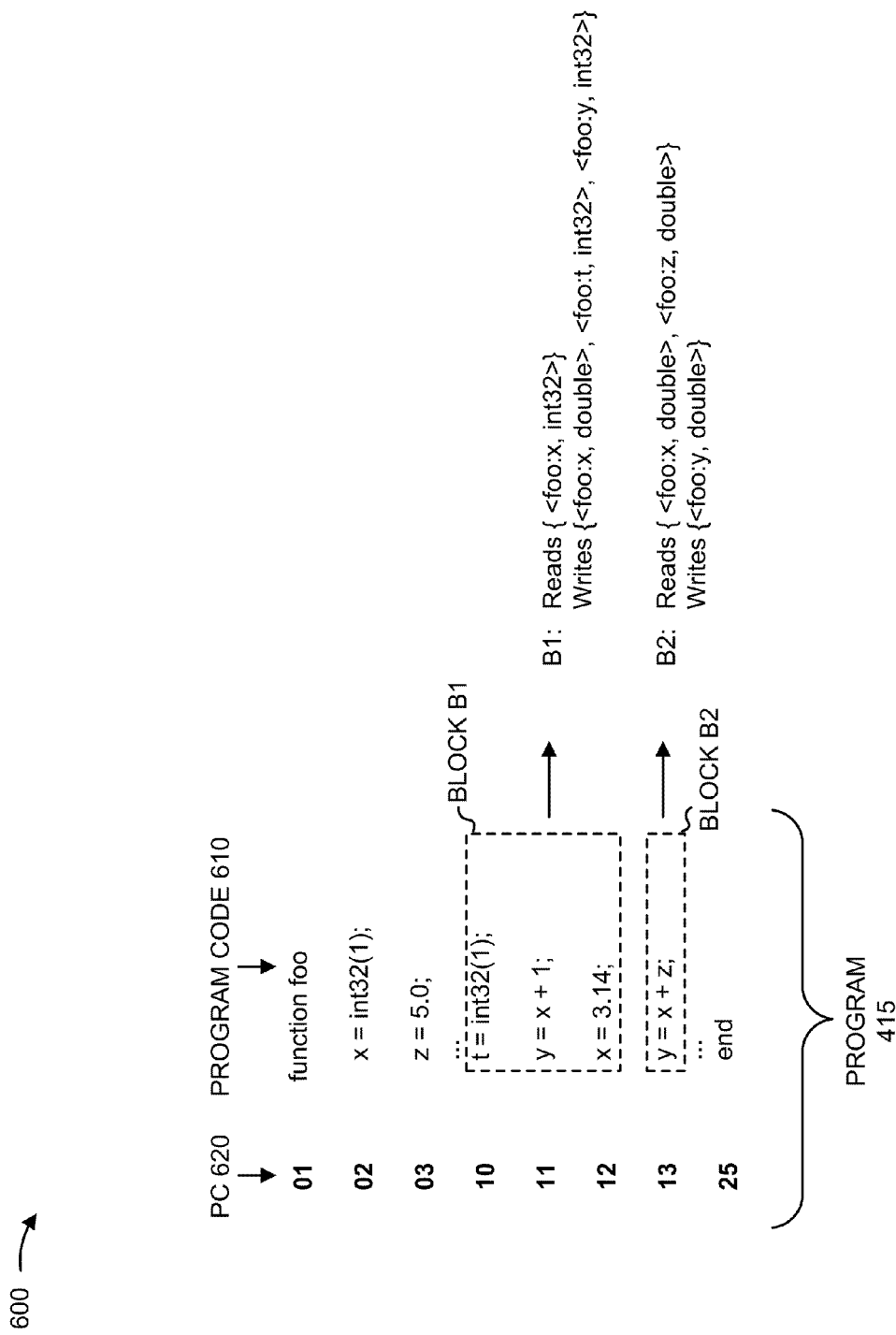
FIG. 6 is a diagram of an example implementation of example blocks that may be compiled based on program code.

FIG. 6 is a diagram of an example implementation 600 of example blocks that may be compiled based on program code.

As shown in FIG. 6, program code 610 of program 415 may include a number of lines of code. In this example, program code 610 may implement a function "foo" and each line of program code 610 may be associated with a value of a program counter (PC) 620. Two segments of program code 610 are illustrated as being associated with blocks: a block B1, associated with lines 10, 11, and 12 of program code 610; and a block B2, associated with line 13 of program code 610.

Block B1 may include three lines of program code 610. A first line of block B1 (PC value 10) may write one variable "t," which is of type "int32." A second line of block B1 (PC value 11) may read one variable "x," which is of type "int32," and may write a variable "y," which is also of type "int32." A third line of block B1 (PC value 12) may write one variable "x," which is of type "double." A complete read list for block B1 may be "<foo:x int32>," which may indicate that the variable "x," in function "foo," is of type "int32." A write list for block B1 may be "<foo:x, double>, <foo:t, int32>, <foo:y, int32>." Start PC 515 for block B1 may have a value of "10." Block B1 may have one exit, exit information 520, that contains a next PC with a value of "13," and the write list "<foo:x, double>, <foo:t, int32>, <foo:y, int32>."

Block B2 may include one line of code (PC value 13), which reads two variables and writes one variable. A read list for block B2 may be "<foo:x, double>, <foo:z, double>" and a write list for block B2 may be "<foo:y, double>." Start PC 515 for block B2 may have a value of "13." Block B2 may have one exit, exit information 520, that contains a next PC with a value of "14," and the write list "<foo:y, double>."

As described above in connection with FIG. 5, original constraints 525 for a block 425 may be based on the read list for block 425. For example, original constraints 525 for block B1 may be "<foo:x, int32>," and original constraints 525 for block B2 may be "<foo:x, double>, <foo:z, double>." When block B1 is linked to block B2, block B1 may include original constraints 525 "<foo:x, int32>," and may include additional constraints 535 "<foo:z, double>" corresponding to original constraints 525 for block B2. For example, the original constraints of a first block may be utilized to generate the additional constraints of a second block when the first block is linked to the second block.

As indicated above, FIG. 6 is provided merely as an example. Other examples are possible and may differ from what was described with regard to FIG. 6.

FIG. 7 is a flow chart of an example process 700 for performing code generation and execution based on program code. In some implementations, one or more process blocks of FIG. 7 may be performed by client device 210. In some implementations, one or more process blocks of FIG. 7 may be performed by another device or a set of devices separate from or including client device 210, such as server device 230.

As shown in FIG. 7, process 700 may include setting the program counter (PC) equal to a start value (block 705) and determining whether the program execution is complete (block 710). For example, with reference to FIG. 4, client device 210 (e.g., TCE 220 including execution engine 460) may set PC 465 to a program counter value corresponding to a first statement that is executed in program 415. Execution engine 460 may determine that program 415 is complete when, for example, PC 465 is assigned a value that corresponds to a termination point in program 415, such as an "end" statement within a main loop of program 415.

As further shown in FIG. 7, if the program execution is complete (block 710—YES), then process 700 may include ending (block 715). For example, with reference to FIGS. 4 and 5, client device 210 (e.g., TCE 220 including execution engine 460) may stop executing program 415 when execution of program 415 is determined to be complete. In some implementations, client device 210 may remove compiled blocks from a cache when ending program execution. Additionally, or alternatively, client device 210 may save compiled blocks associated with a cache when ending program execution to save compiling time when program 415 is executed again.

As further shown in FIG. 7, if the program execution is not complete (block 710—NO), then process 700 may include locating blocks corresponding to the PC in the cache (block 720). For example, with reference to FIGS. 4 and 5, client device 210 (e.g., TCE 220) may use a value of PC 465 to lookup zero or more blocks 425, from cache 420, in which a starting PC value of blocks 425 match the value of PC 465. In some implementations, no blocks 425 may match the value of PC 465. For instance, a first time a particular block 425 is reached, during execution of program 415, the particular block 425 may not be in cache 420. In some implementations, multiple blocks 425, each having different sets of original constraints 525 and/or additional constraints 535, may be located in cache 520.

As further shown in FIG. 7, process 700 may include checking constraints corresponding to any located blocks (block 725). For example, with reference to FIG. 4, client device 210 (e.g., TCE 220 including constraint checker 440) may determine actual types of variables and/or temporary program values in the program being executed, by execution engine 460, and may compare type-based constraints (e.g., original constraints and additional constraints) in blocks 425 to the actual types in the computing environment. In some implementations, when all the type-based constraints for a particular block 425 are satisfied by the actual types in the computing environment, the particular block 425 may be deemed to be a compatible block (e.g., a block with compatible constraints, such as compatible original constraints, compatible original constraints and additional constraints, or the like). For example, consider a block 425 with a single constraint that includes a condition that a variable "x" is of type "double." If the variable "x," in the current computing environment, is of type "double," block 425 may be considered a compatible block. If the variable "x" is of any other type, block 425 may not be considered to be a compatible block.

As further shown in FIG. 7, process 700 may include determining whether a compatible block is found with compatible original constraints and compatible additional constraints (block 730). For example, client device 210 may determine whether at least one block is located (e.g., in block 720) for which the type-based constraints (e.g., the original constraints and the additional constraints) are compatible with the current computing environment (e.g., as determined in block 725). If the block lacks additional constraints (e.g., is not a block linked to another block), then the block is deemed to have compatible original constraints and additional constraints if the block has compatible original constraints. For example, a block with compatible original constraints and no additional constraints is considered to have compatible original constraints and compatible additional constraints.

As further shown in FIG. 7, if a compatible block is not found with compatible original constraints and compatible additional constraints (block 730—NO), process 700 may include determining whether a compatible block is found with compatible original constraints (block 735). For example, client device 210 may determine whether at least one block is located (e.g., in block 720) for which the type-based original constraints are compatible with the current computing environment (e.g., as determined in block 725). In this case, client device 210 may determine whether a block would have compatible constraints if the additional constraints (and the other block concomitant with the additional constraints) were not linked to the block.

In some implementations, client device 210 may determine that a set of blocks have compatible original constraints. For example, assume that a first block is linked to a second block and the second block is linked to a third block. Further assume that original constraints of the first block and first additional constraints of the first block are compatible with the current computing environment, but that second additional constraints of the first block are not compatible with the current computing environment. In this example, the first additional constraints correspond to original constraints of the second block and the second additional constraints correspond to original constraints of the third block. In this case, the first block and the second block may be deemed to be compatible with the current computing environment, but the third block may be deemed not to be compatible with the current computing environment.

As further shown in FIG. 7, if a compatible block is not found with compatible original constraints (block 735—NO), process 700 may include compiling the current block (block 740), adding the current block to the cache (block 745), and returning to block 710. For example, with reference to FIG. 4, client device 210 (e.g., TCE 220 including compiler 410) may receive a program segment, from program 415, corresponding to a next block in program 415. Compiler 410 may compile the next block. After compiling the next block, compiler 410 may store the next block in cache 420. Additionally, or alternatively, compiler 410 may transmit the block directly to execution engine 460.

As further shown in FIG. 7, if a block is found with compatible original constraints (block 735—YES), process 700 may include cloning the compatible block (block 750). For example, client device 210 may clone the compatible block. In some implementations, client device 210 may copy compiled executable code and the original constraints of the compatible block when cloning the compatible block, without copying a link to a subsequent block or additional constraints associated with the subsequent block. Additionally, or alternatively, client device 210 may generate an information pointer to the compiled executable code and the original constraints of the compatible block when cloning the compatible block. In some implementations, a cloned block may be linked to another block. For example, as described herein with regard to block 760, the cloned block may be linked to another block by generating linking information that indicates an execution order for the cloned block and the other block. In this case, client device 210 may utilize the cloned block in a similar manner to other compiled blocks.

In some implementations, client device 210 may clone the first block linked to a clone of a second block without a link to a clone of a third block. As an example, client device 210 may generate a first cloned block from the first block that includes first original constraints of the first block, first additional constraints of the first block, and first linking information. In this example, the first additional constraints may correspond to second original constraints of the second block. In this example, the first linking information may be associated with the second block. Further to the example, client device 210 may exclude second additional constraints corresponding to the original constraints of the third block. Further to the example, client device 210 may generate a second cloned block with second original constraints of the second block but without second linking information and without third additional constraints. In this example, the second linking information may correspond to linking information of the second block to the third block. In this example, the third additional constraints may correspond to original constraints of the third block.

As further shown in FIG. 7, process 700 may include adding the cloned block to the cache (block 755), and may return to block 710. For example, with reference to FIG. 4, client device 210 (e.g., TCE 220) may store the cloned block in cache 420. Additionally, or alternatively, client device 210 may transmit the block directly to execution engine 460.

As further shown in FIG. 7, if a compatible block is found with compatible original constraints and compatible additional constraints (block 730—YES), process 700 may include linking the compatible block to a last executed block (block 760). For example, with reference to FIG. 4, client device 210 (e.g., TCE 220 including link manager 450) may determine direct links and/or indirect links between blocks 425. A link between a first block and a second block may indicate that, when constraints of the first block are satisfied, the constraints of the second block may also be satisfied. Additionally, or alternatively, client device 210 may generate additional constraints for the last block. For example, client device 210 may add additional constraints to the last block corresponding to the original constraints and/or the additional constraints of the current block. In some implementations, client device 210 may generate multiple sets of additional constraints for the last block, corresponding to the original constraints of the current block and one or more sets of additional constraints associated with one or more other blocks linked to the current block.

As further shown in FIG. 7, process 700 may include executing the compatible block and, based on exit information, additional linked blocks (block 765), setting the program counter value equal to the next program counter value at the end of the last executed block (block 770), and returning to block 710. For example, with reference to FIG. 4, based on links associated with the compatible block, client device 210 (e.g., TCE 220 including execution engine 46) may execute one or more additional linked blocks without having to perform additional constraint checking. Additionally, or alternatively, client device 210 may execute the one or more additional linked blocks with a less complex constraint checking procedure relative to a block that is not associated with a link. After execution of a block 425, execution engine 460 may set PC 465 to a next PC value. For example, the next PC value may be a next PC value relative to a last executed block 425.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8A:
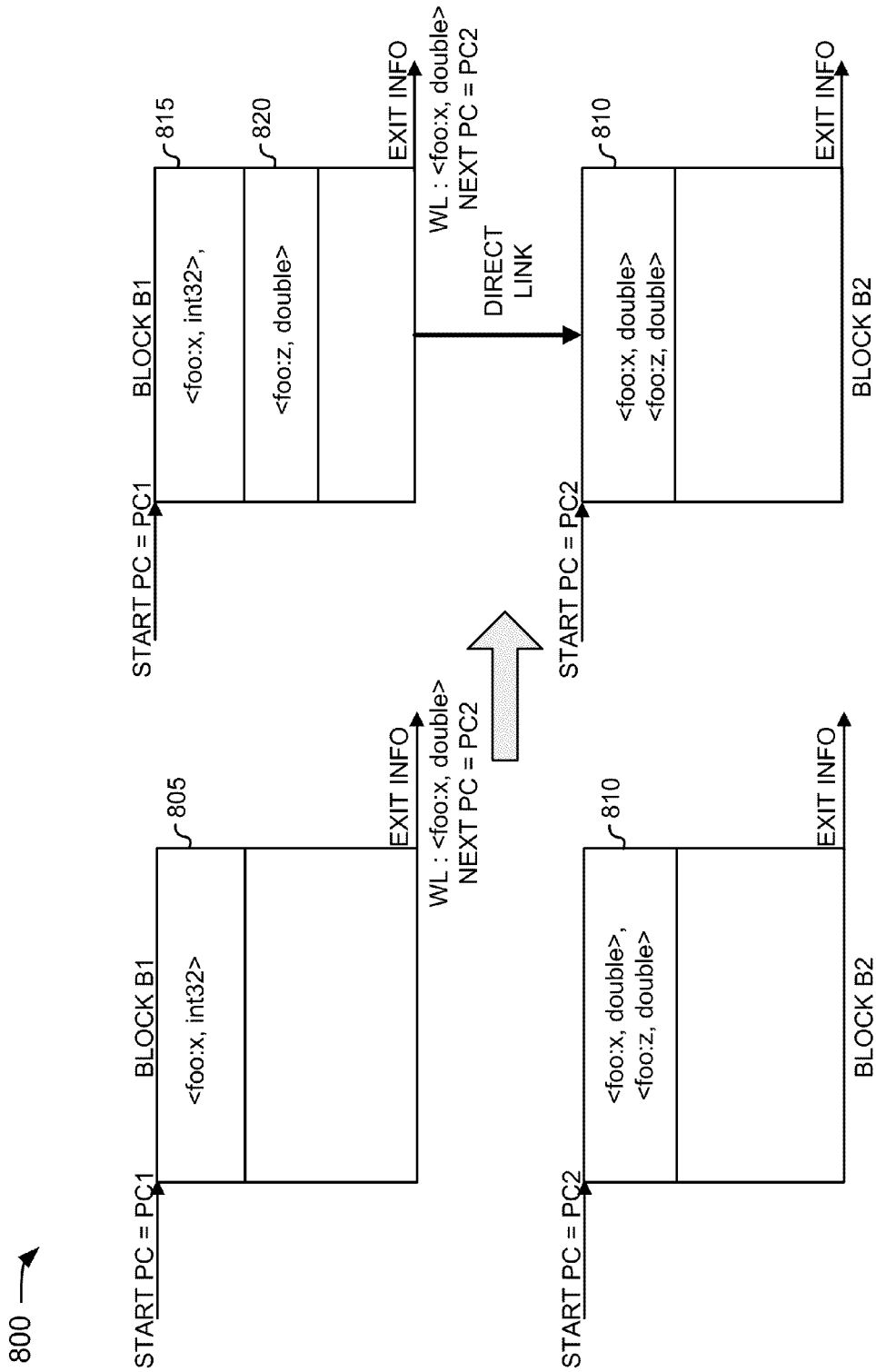
FIGS. 8A and 8B are diagrams of an example implementation of performing code generation and execution for a dynamic programming language.
Figure 8B:
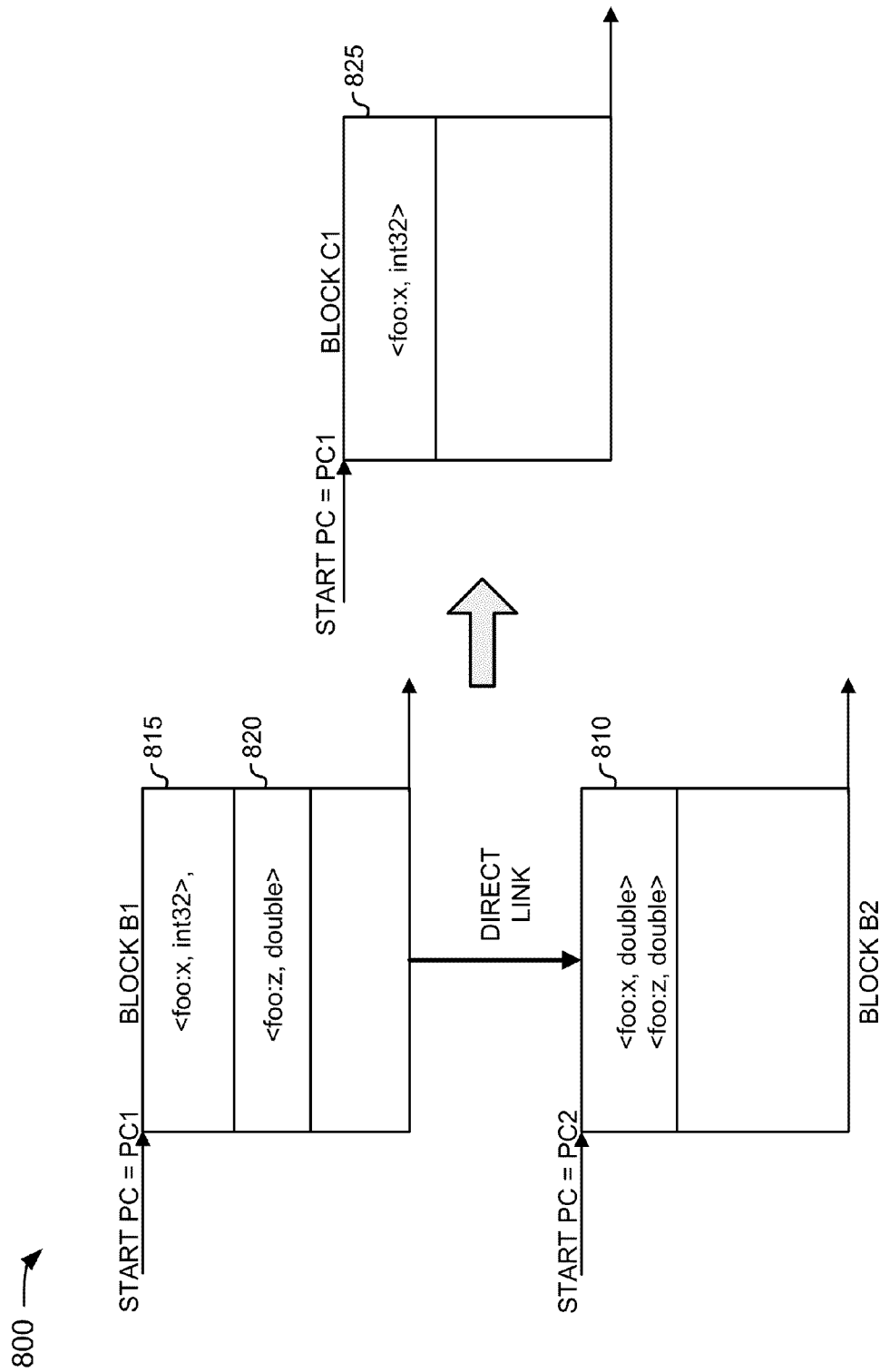

FIGS. 8A and 8B are diagrams of an example implementation 800 of performing code generation and execution for a dynamic programming language. With regard to FIGS. 8A and 8B, block B1 and block B2 may correspond to block B1 and block B2, respectively, of FIG. 6.

As further shown in FIG. 8A, block B1 may be initially associated with a read list "<foo:x, int32>." The read list for block B1 may correspond to initial constraints 805 for block B1. Block B2 may be initially associated with a read list "<foo:x, double>, <foo:z, double>." The read list for block B2 may correspond to initial constraints 810 for block B2.

In general, a direct link between two blocks 425 may be created by link manager 450 when a next program counter value after a block 425 is known at compile time. In this case, a direct link can be created between a first block 425 and a next block 425 that has a starting program counter value equal to the next program counter value after the first block 425. For blocks B1 and B2, code corresponding to block B2 is in the same lexical scope as code corresponding to block B1, since both blocks B1 and B2 include the function "foo." Block B2 follows block B1, as the start PC of block B2 (PC2) is the same as the next PC in the exit information of block B1. Accordingly, link manager 450 may create a direct link between blocks B1 and B2, as shown in FIG. 8A.

Because blocks B1 and B2 are directly linked and are within the same lexical scope as one another, link manager 450 may back-propagate constraints from block B2 to block B1. Back-propagating constraints may refer to adding a constraint, such as an original constraint or an additional constraint, from a later block 425 in a series of directly linked blocks, to an earlier block 425 as an additional constraint. In some implementations, constraints may be back-propagated, from a directly linked next block 425 to a previous block 425, whenever a constraint in the next block 425 is not in a write list of the previous block 425. In the example of FIG. 8A, the constraint "<foo:z, double>" may be back-propagated from block B2 to block B1. The constraint "<foo:x, double>," however, which is included in the write list of block B1 (see FIG. 6), may not be back-propagated, as the type of variable "x" is guaranteed for block B2 (e.g., an int32-type constraint guarantees at least a double-type constraint). As shown in FIG. 8A, after back-propagation, original constraints 815 for block B1 may be "<foo:x, int32>" and additional constraints 820 for block B1 may be "<foo:z, double>," and original constraints 810 for block B2 may remain "<foo:x, double>, <foo:z, double>."

With regard to FIG. 8B, assume that during code generation and execution, client device 210 may determine that the constraints of block B1 (e.g., original constraints 815 and additional constraints 820) are not compatible with an execution environment, but may determine that original constraints 815 are compatible with the execution environment. Client device 210 (e.g., TCE 220), may clone block B1 to generate block C1. Block C1 may include constraints 825 that correspond to initial constraints 815 and may lack a direct link to another block corresponding to B2. The compiled information associated with block B1 may be cloned to block C1, such as by copying the compiled information, generating an information pointer to the compiled information, or the like. In this way, client device 210 may save compiling time and resources by copying compatible aspects of an already-compiled block (e.g., aspects that do not correspond to a non-compatible already-compiled block).

As indicated above, FIGS. 8A and 8B are provided merely as an example. Other examples are possible and may differ from what was described with regard to FIGS. 8A and 8B.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A computer-readable medium storing instructions, the instructions comprising:
   one or more instructions that, when executed by one or more processors, cause the one or more processors to:
      receive programming code, corresponding to a dynamic programming language, that is to be executed by a computing environment, and
      execute the received programming code,
      when executing the received programming code, the one or more processors are to:
         select a first block of the received programming code,
            the first block corresponding to a first segment of the received programming code,
            the first block including a set of type-based original constraints corresponding to a set of type-based desired constraints and a set of type-based additional constraints not corresponding to the set of type-based desired constraints,
            the set of type-based additional constraints being associated with a second block that is linked to the first block and corresponding to a second segment of received programming code,
         generate a cloned block corresponding to the first block,
            the cloned block including a set of type-based cloned constraints corresponding to the set of type-based original constraints and compiled programming code corresponding to compiled programming code of the first block,
            the cloned block not including a particular set of type-based constraints corresponding to the set of type-based additional constraints, and
         cache the cloned block for selection and execution.

2. The computer-readable medium of claim 1, where the one or more instructions, that cause the one or more processors to generate the cloned block, further cause the one or more processors to:
   copy the compiled programming of the first block; and
   copy the set of type-based original constraints.

3. The computer-readable medium of claim 1, where the one or more instructions, that cause the one or more processors to generate the cloned block, further cause the one or more processors to:
generate information associated with pointing to a memory location storing the compiled programming code associated with the first block; and
generate information associated with pointing to a memory location storing the set of type-based original constraints.

4. The computer-readable medium of claim 1, where the one or more instructions, when executed by the one or more processors, further cause the one or more processors to:
execute a set of compiled blocks in an order based on one or more of a program counter, one or more type-based constraints, or linking information,
the set of compiled blocks including the cloned block,
the program counter identifying an execution location within the received programming code,
the one or more type-based constraints being associated with the set of compiled blocks,
the linking information being generated to link certain ones of the set of compiled blocks based on the one or more type-based constraints and relating to an indication that the certain ones of the compiled blocks will execute in an order indicated by the linking information.

5. The computer-readable medium of claim 1, where the set of type-based cloned constraints additionally relates to a set of types of temporary program values that are used by the cloned block.

6. The computer-readable medium of claim 1, where the first block and the cloned block correspond to the first segment of the received programming code.

7. The computer-readable medium of claim 1, where the one or more instructions, when executed by the one or more processors, further cause the one or more processors to:
generate linking information between the cloned block and a third block,
the linking information relating to an indication that the cloned block and the third block will execute in an order indicated by the linking information.

8. The computer-readable medium of claim 7, where the one or more instructions, when executed by the one or more processors, further cause the one or more processors to:
back-propagate a set of type-based third particular constraints associated with the third block to the cloned block as additional constraints for the cloned block.

9. The computer-readable medium of claim 1, where the one or more instructions, when executed by the one or more processors, further cause the one or more processors to:
compile the first block based on the first segment of the received programming code,
the first block including the set of type-based original constraints relating to types of temporary program values utilized by the first block,
the set of type-based original constraints being original constraints for the first block;
compile the second block based on the second segment of the received programming code,
the second block including the set of type-based additional constraints relating to types of temporary program values utilized by the second block,
the set of type-based additional constraints being original constraints for the second block;
generate linking information to link the first block and the second block based on compiling the first block and the second block,
the linking information indicating that the second block is to execute directly after the first block,
back-propagate the original constraints for the second block to the first block as additional constraints for the first block; and
associate information with the first block that distinguishes the original constraints for the first block from the additional constraints for the first block.

10. A method, comprising:
receiving programming code, corresponding to a dynamic programming language, that is to be executed in a computing environment,
the receiving being performed by a device; and
executing the received programming code,
the executing the received programming code being performed by the device and further comprising:
determining that, for a first block associated with first constraints and second constraints, the first constraints match a set of desired constraints,
the first block being associated with a desired program counter value identifying an execution location within the received programming code,
the first constraints being associated with a first segment of programming code that is compiled for execution when the first block is executed,
the second constraints being associated with a second segment of programming code that is compiled for execution when a second block that is linked to the first block is executed after the first block is executed,
the second constraints not matching the set of desired constraints, and
the determining that the first constraints match the set of desired constraints being performed by the device, and
cloning the first block to generate a third block,
the third block including third constraints corresponding to the first constraints and compiled information associated with performing execution of the first segment of programming code, and
the cloning the first block being performed by the device.

11. The method of claim 10, further comprising:
caching the third block along with the third constraints.

12. The method of claim 10, where cloning the first block further comprises:
copying compiled information associated with executing the first segment of code when the first block is executed,
the copying the compiled information being associated with causing the first segment of code to be executed when the third block is executed.

13. The method of claim 10, where cloning the first block further comprises:
copying the first constraints associated with the first block to generate the third constraints.

14. The method of claim 10, where cloning the first block further comprises:
generating one or more information pointers associated with directing the device to execute compiled information associated with the first block when executing the third block, the compiled information associated with the first block being associated with executing the first segment of code.

15. The method of claim 10, where cloning the first block further comprises:
generating one or more information pointers associated with directing the device to utilize the first set of constraints associated with the device when utilizing the third constraints.

16. The method of claim 10, where the first constraints are type-based constraints, the second constraints are type-based constraints, and the third constraints are type-based constraints.

17. The method of claim 10, further comprising:
executing a set of compiled blocks in an order based on one or more of a program counter, constraints associated with blocks, of the set of compiled blocks, or linking information associated with blocks, of the set of compiled blocks,
the set of compiled blocks including the first block, the second block, and the third block.

18. The method of claim 17, where executing the set of compiled blocks further comprises:
identifying the set of desired constraints;
determining that the first constraints correspond to the set of desired constraints;
determining that the second constraints do not correspond to the set of desired constraints;
determining that the third constraints correspond to the set of desired constraints; and
selecting the third block for execution.

19. A device, comprising:
one or more processors to:
identify a first compiled block with an original constraint and an additional constraint,
the first compiled block being identified based on a program counter value identifying an execution location associated with received programming code,
the first compiled block including compiled information relating to a first segment of the programming code,
the first compiled block including linking information associated with identifying a second compiled block that is to be executed directly after the first compiled block,
the first compiled block including information distinguishing the original constraint from the additional constraint,
the original constraint being a type-based constraint relating to a type of variable being used in the first segment of programming code,
the additional constraint being a type-based constraint relating to a type of variable being used in a second segment of programming code associated with execution when the second compiled block is executed;
determine that the original constraint corresponds to a desired constraint,
the additional constraint not corresponding to the desired constraint;
copy information from the first compiled block to generate a third compiled block,
the copied information including information corresponding to the compiled information relating to the first segment of programming code,
the copied information including the original constraint,
the copied information not including the additional constraint; and
execute the third compiled block to execute a program associated with the received programming code.

20. The device of claim 19, where the one or more processors, when executing the third compiled block, are further to:
execute the third compiled block at a time associated with the program counter value.

* * * * *